United States Patent [19]
Swenson

[11] 3,990,537
[45] Nov. 9, 1976

[54] PORTABLE SEAT

[76] Inventor: Gordon G. Swenson, P.O. Box 471, Pelican Rapids, Minn. 56572

[22] Filed: Nov. 17, 1975

[21] Appl. No.: 632,227

[52] U.S. Cl. .............................. 182/187; 108/135; 108/152; 248/221 A
[51] Int. Cl.² .......................................... E04G 3/00
[58] Field of Search ................. 108/134, 135, 152; 182/187, 188; 248/221 R, 221 A, 221 C

[56] References Cited
UNITED STATES PATENTS

| | | | |
|---|---|---|---|
| 3,719,252 | 3/1973 | Tiley | 182/187 |
| 3,729,160 | 4/1973 | D'Imperio | 108/152 X |

Primary Examiner—James C. Mitchell
Attorney, Agent, or Firm—Merchant, Gould, Smith, Edell, Welter & Schmidt

[57] ABSTRACT

A sportsman's accessory for convenient temporary attachment to a tree or post to provide a seat. A flat seat member is secured to a mounting bar projecting rearwardly therefrom. The bar terminates in a threaded fastening member for screwing into a tree or the like. A peg member having a pointed end is pivoted at its other end to the mounting bar, which is hinged at a location between the seat and the fastening means. The pivotal axes of the hinge on the peg member are transverse to the bar and parallel mutually and to the seat member.

1 Claim, 4 Drawing Figures

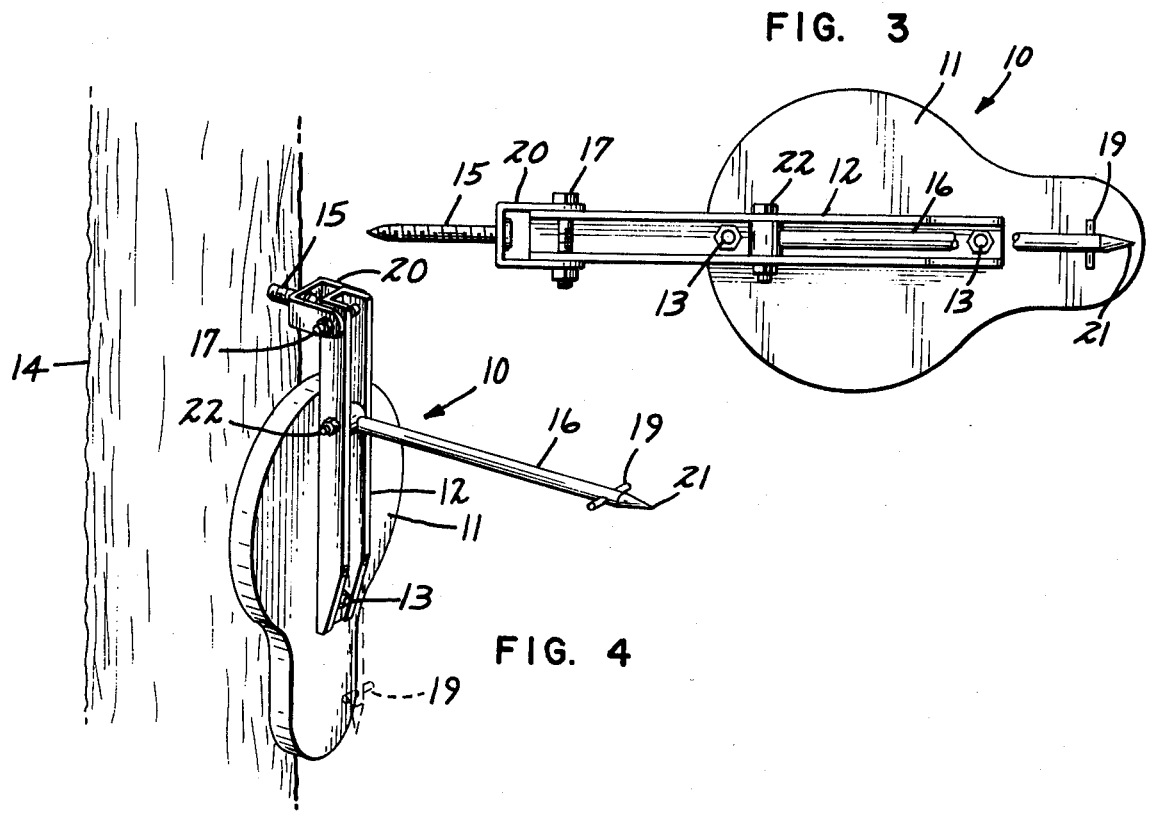
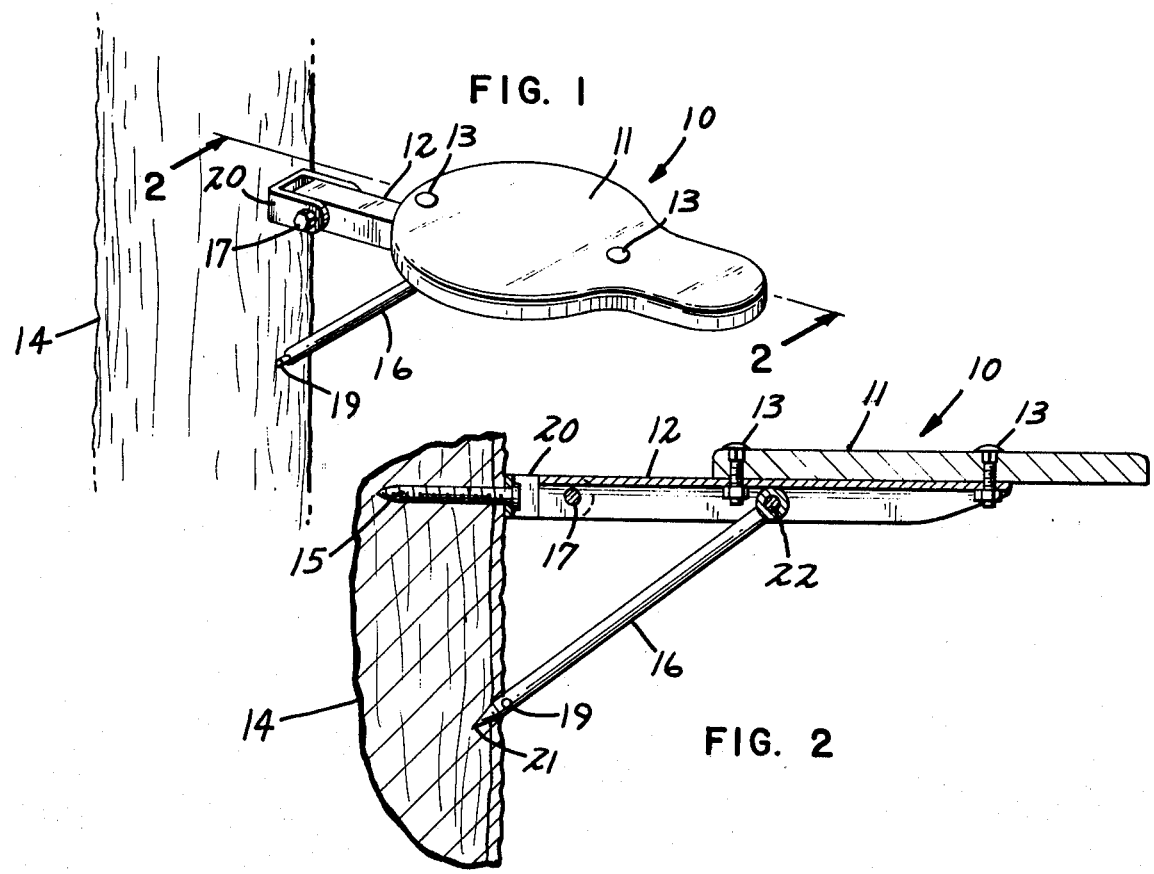

PORTABLE SEAT

BACKGROUND OF THE INVENTION

This invention relates to the field of sportsman's accessories and specifically comprises a readily portable structure which can easily be applied to a tree or a post to provide a seat for the sportsman's rest and relaxation. While the broad idea of such a portable seat is not new, they have not heretofore been simple, sturdy, and easily applied and removed.

SUMMARY OF THE INVENTION

My invention comprises a seat member secured to a mounting bar which extends rearwardly therefrom along an axis which terminates rearwardly in threaded fastening means to be screwed into the desired tree, by grasping the seat and rotating the bar about its axis. A peg member is pivoted to the bar at one end, the other end being pointed to easily penetrate the tree and act as a diagonal brace under the seat. The mounting bar is not solid, but is hinged between the fastening means and the seat. The pivotal axes of the hinge and the peg member are parallel mutually and to the plane of the seat member. This arrangement makes it possible, after the fastener is first started into the hole, to pivot the mounting bar with respect to the fastening means, and the peg member with respect to the mounting bar, in such a way as to temporarily form a crank having a substantial length of crank arm, whereby to provide a large mechanical advantage and facilitate the insertion of the fastening means to a depth where it is firm and rigid. Thereafter, the mounting arm is made horizontal with the peg member penetrating into the tree to give outboard support to the seat, which would otherwise be cantilevered and hence not sufficiently strong.

Various advantages and features of novelty which characterize my invention are pointed out with particularity in the claims annexed hereto and forming a part thereof. However, for a better understanding of the invention, its advantages and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, FIG. 1 is a perspective view of a device according to my invention installed on a tree;

FIG. 2 is a view in longitudinal section taken along the line 2—2 of FIG. 1;

FIG. 3 is a bottom view of the device separated from the tree; and

FIG. 4 is a perspective view of a stage in the fastening of the seat structure to a tree.

DESCRIPTION OF THE PREFERRED EMBODIMENT

Turning now to FIG. 1, a seat structure 10 according to my invention is shown to comprise a seat member 11 secured to a mounting bar 12 by suitable fasteners 13. Mounting bar 12 is secured endwise to a tree 14 by a threaded fastening member 15 shown better in the other figures. A peg member 16 acts as a diagonal brace from seat 11 to the tree, into which it penetrates.

Structural details of the arrangement are more clearly shown in FIGS. 2 and 3. It will be seen that bar 12 is not unitary, but is hinged about a pivot or bolt 17 so that member 15, which may be a lag screw, is carried in a bracket 20 to which it is secured as by welding. The axis of pivot 17 is transverse to bar 12 and generally parallel to the bottom of seat member 11. The end of peg member 16 which contacts tree 14 is pointed at 21, to more readily penetrate the tree sufficiently to give firm support, and may include a cross pin 19 or other depth stop. The other end of peg member 16 is connected to mounting bar 12 at a pivot or bolt 22 under seat 11, the pivotal axis being parallel to that of pivot 17.

For storage or transportation, the structure is substantially flat: bracket 20 may be turned so that member 15 extends axially of mounting bar 12, and the peg member may be pivoted against the mounting bar. When it is desired to use the seat, it is held horizontally as shown in FIG. 3, and fastener member 15 is impacted into the tree at the desired height. Then the unit is rotated about the axis of mounting bar 12, as though it were a large clock key, screwing member 15 into the tree.

For greater leverage and speed in mounting, the parts of the device may be arranged about the pivots as shown in FIG. 4. Here it will be seen that peg member 16 is now positioned to act as a crank in securing member 15 into the tree: a crank arm, which is the distance between pivots 17 and 22, is sufficiently large to give great mechanical advantage, and member 15 may quickly be set into the tree as far as is desired. Now, if mounting bar 12 is positioned to align its axis with that of fastener 17 and the structure is turned with seat member 11 up, the front of the latter may be raised above the horizontal by the amount of penetration to be expected from point 21, the latter is pressed against the tree, and seat 11 is pressed downward. The result is a seat securely fastened to the tree, which can, nevertheless, be removed therefrom quickly by reversing the procedure just described.

From the foregoing, it will be evident that I have invented a portable seat which may be easily and quickly attached to any tree or post, which is simple of construction and use, which has no loose parts to be mislayed, and which occupies relatively little space for transportation.

Numerous characteristics and advantages of my invention has been set forth in the foregoing description, together with details of the structure and function of the invention, and the novel features thereof are pointed out in the appended claims. The disclosure, however, is illustrative only, and changes may be made in detail, especially in matters of shape, size and arrangement of parts, within the principle of the invention, to the full extent indicated by the broad general meaning of the terms in which the appended claims are expressed.

What is claimed is:
1. A portable seat comprising:
   a. a substantially flat seat member having top and bottom surfaces;
   b. a mounting bar attached to the bottom surface of said seat member, said mounting bar being secured on said bottom surface;
   c. said mounting bar being generally a channel-iron like bar having opposed side walls extending outwardly from the bottom surface of said seat member, said mounting bar having opposed ends with the side walls adjacent one of said ends tapering toward the bottom surface of said seat member;

d. a U-shaped bracket, the opposed sides of said U-shaped bracket having bolt connecting openings for receiving a bolt therein;
e. one end of said mounting bar extending outwardly from the periphery of said seat member, said mounting bar end being attached to said U-shaped bracket by means of a pivot pin which extends through the opposed walls of said U-shaped bracket and the opposed side walls of said mounting bar to pivotally mount the mounting bar to said U-shaped bracket by means of a pivot axis extending transverse to the longitudinal axis of said mounting bar;
f. a screw threaded fastening member attached to said U-shaped bracket for threaded penetration of a post or tree to which the portable seat may be attached, said fastening member being orientable with the longitudinal axis of said mounting bar;
g. a peg member having one end with a penetrating point and an opposed second end, said opposed second end of said peg member being pivotally connected to said mounting bar by means of a pivot pin having its longitudinal axis oriented transversely to the longitudinal axis of said mounting bar, said peg member being mounted to said mounting bar at a location which is removed longitudinally from the end of said mounting bar which is connected to said U-shaped bracket;
h. said peg member having a diameter less than the distance between the opposed side walls of said mounting bar to allow said peg member to be recessed within said mounting bar when the portable seat is folded for storage or transport purposes; and
i. a cross-pin attached to said peg member adjacent the peg member penetrating point to limit the depth of penetration of said peg member into a post or tree to which the portable seat may be attached, said cross-pin having a longitudinal axis extending transversely of the longitudinal axis of said peg member.

* * * * *